Figure 1:
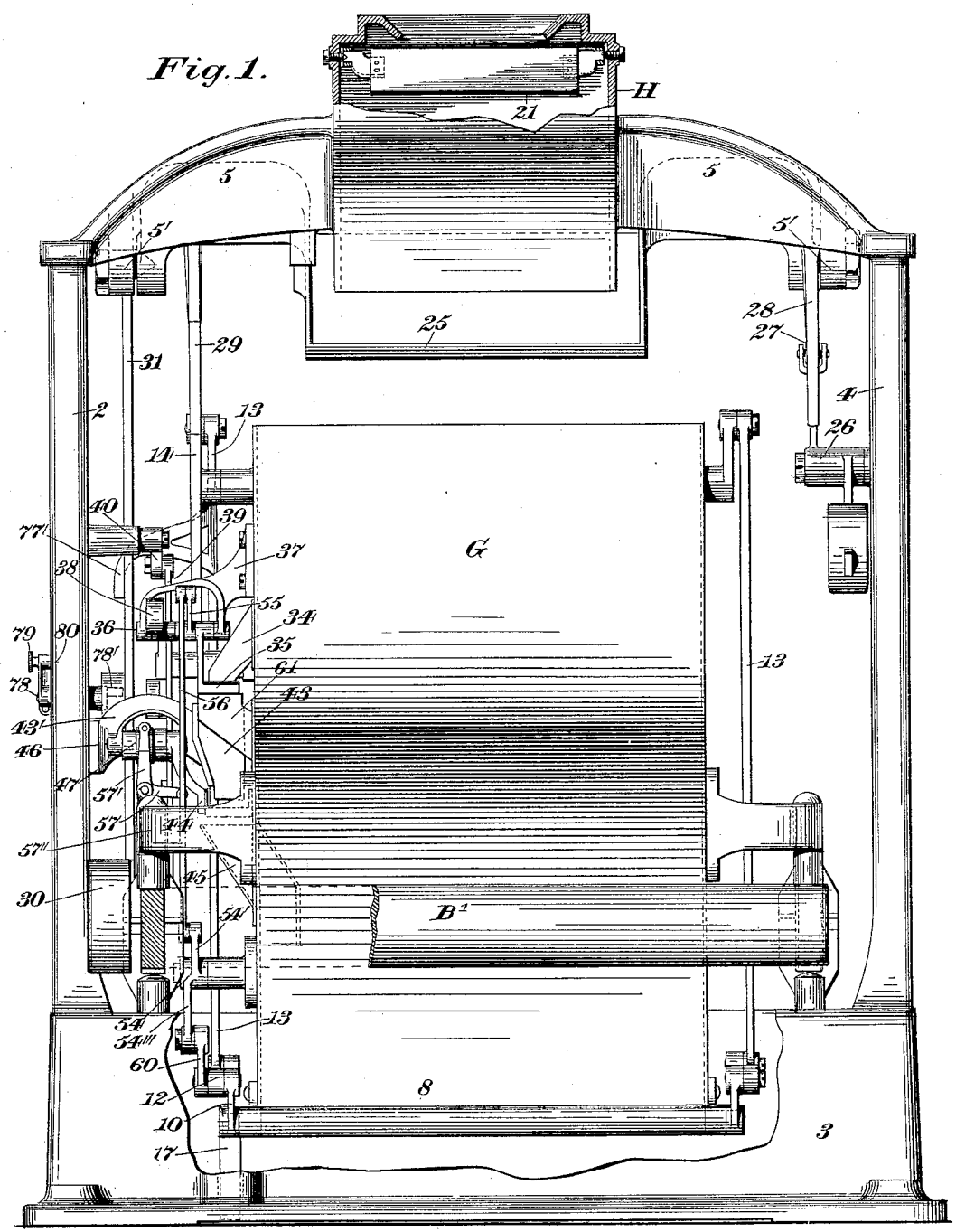

(No Model.)  F. H. RICHARDS.  8 Sheets—Sheet 1.
WEIGHING MACHINE.

No. 572,071.  Patented Nov. 24, 1896.

Witnesses:  Inventor:
Chas. H. Schmidt  F. H. Richards.
J. L. Edwards Jr.

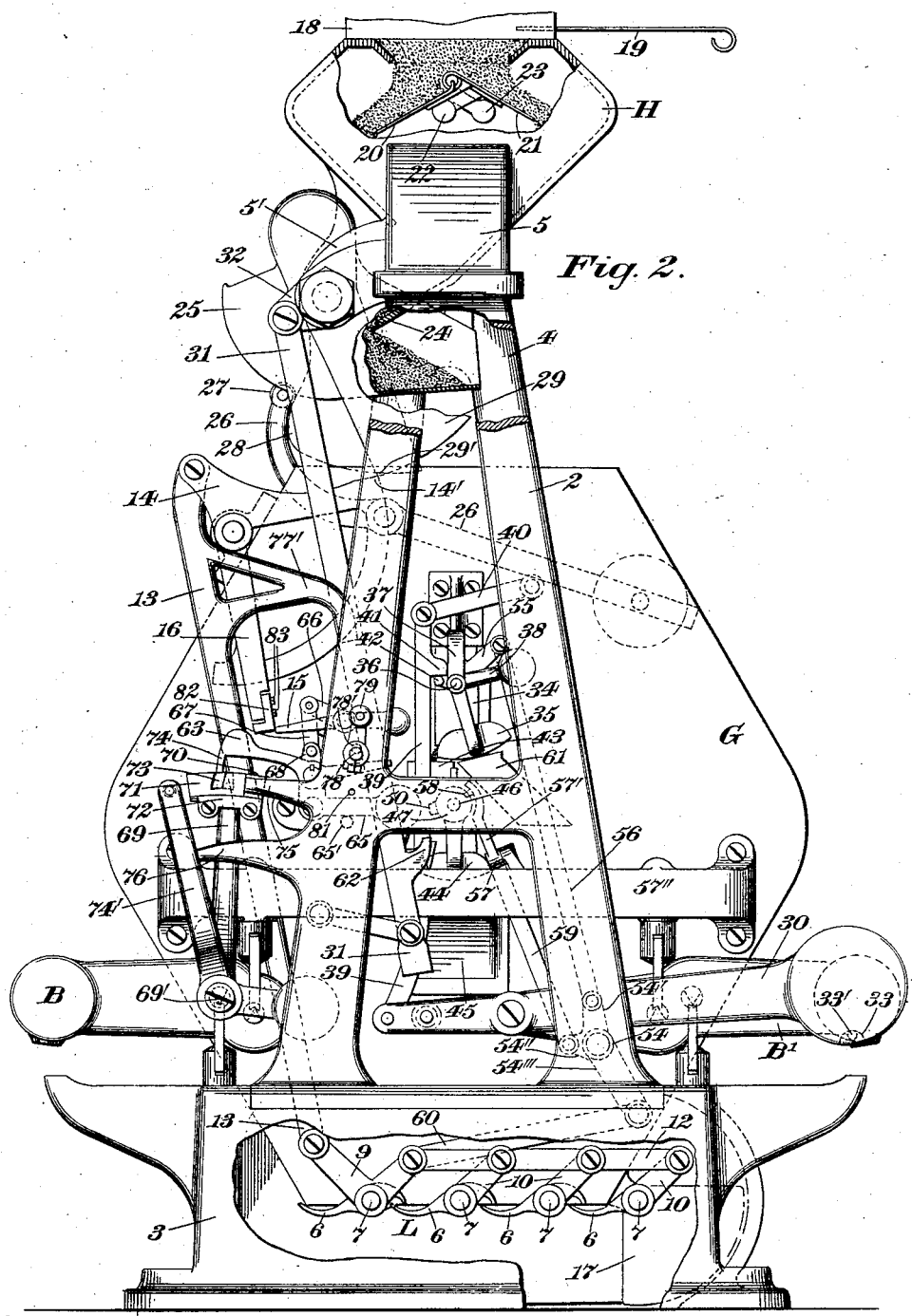

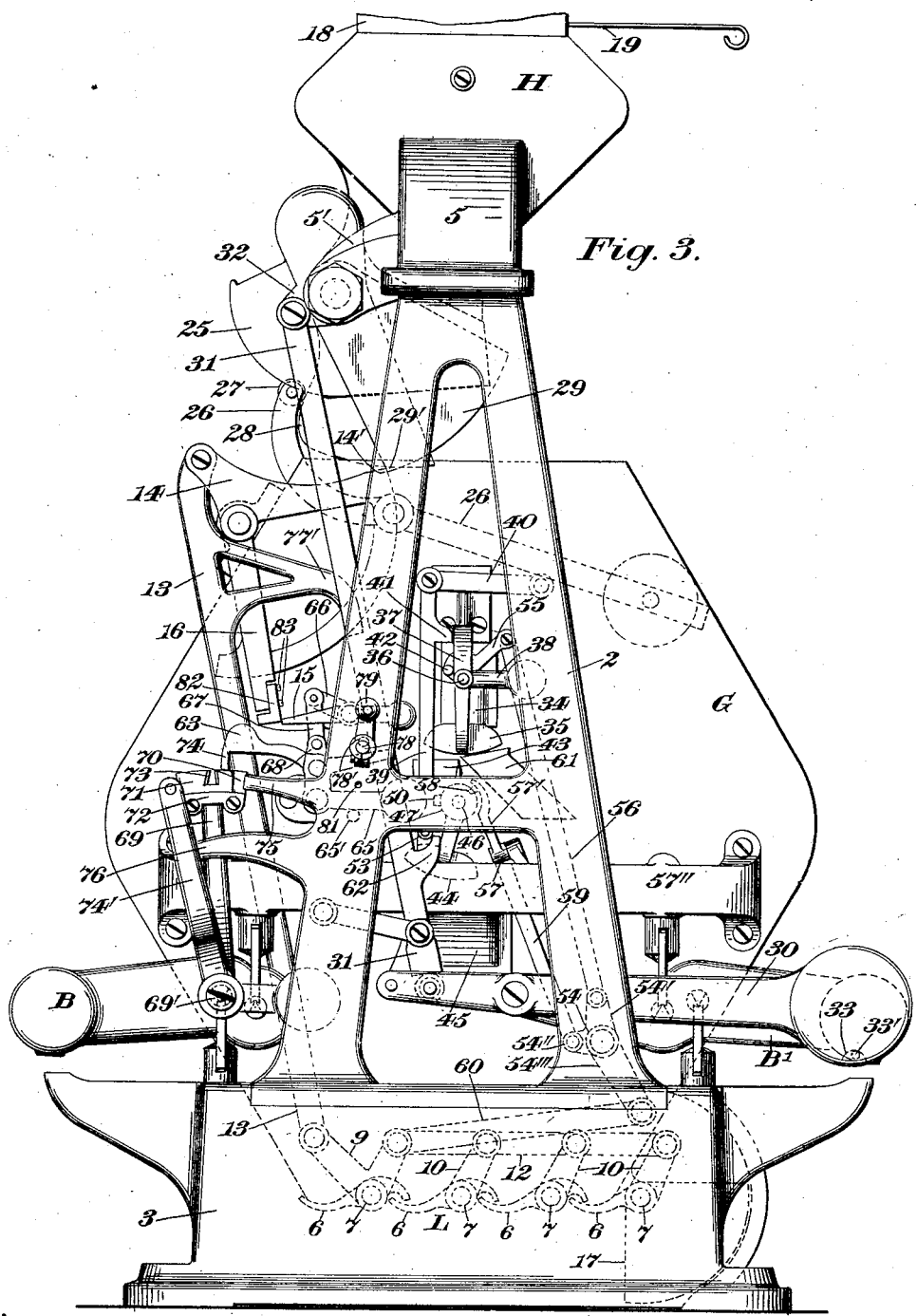

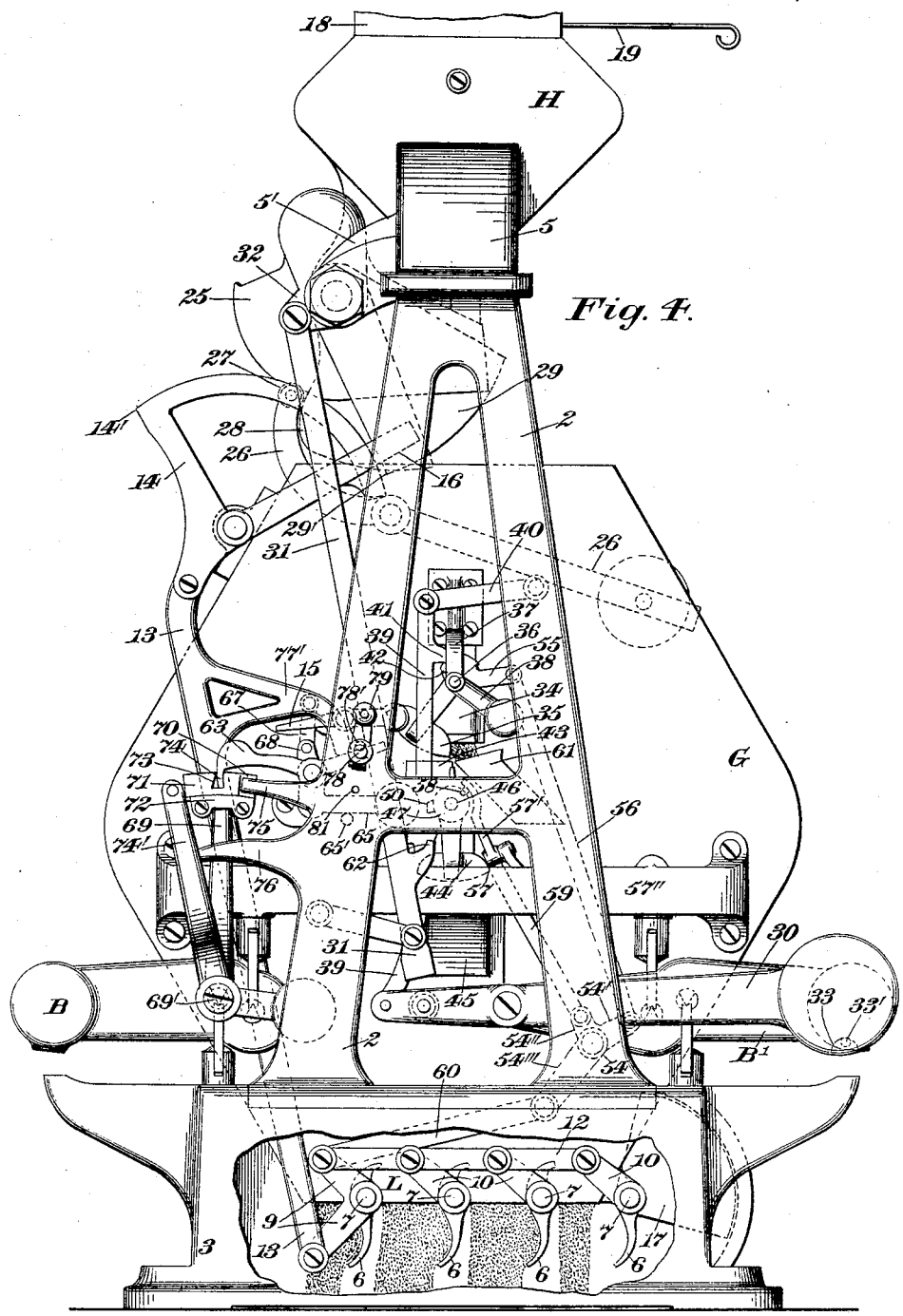

(No Model.) 8 Sheets—Sheet 5.
F. H. RICHARDS.
WEIGHING MACHINE.
No. 572,071. Patented Nov. 24, 1896.
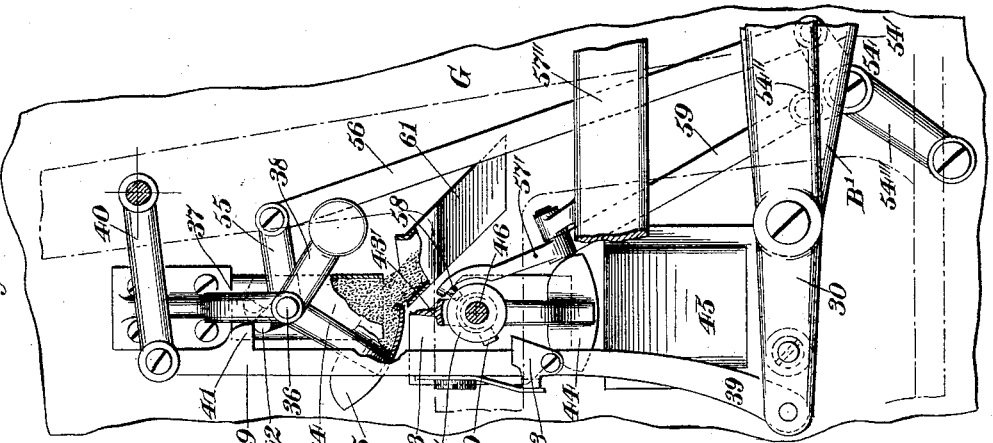
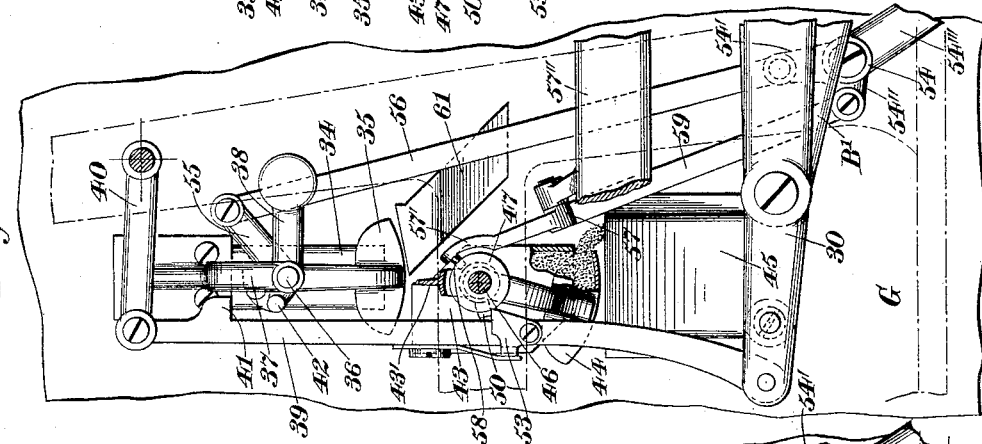
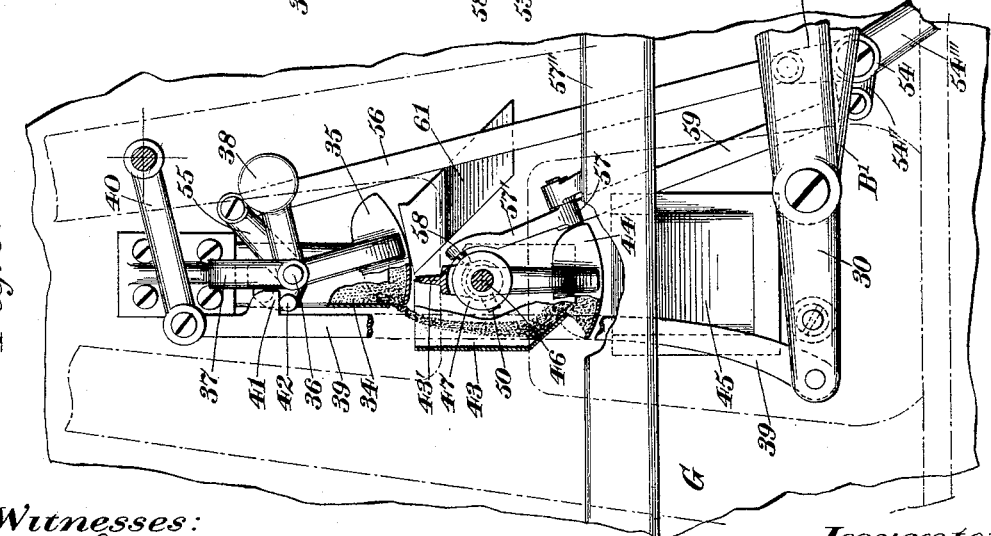
Witnesses:
Inventor:
F. H. Richards

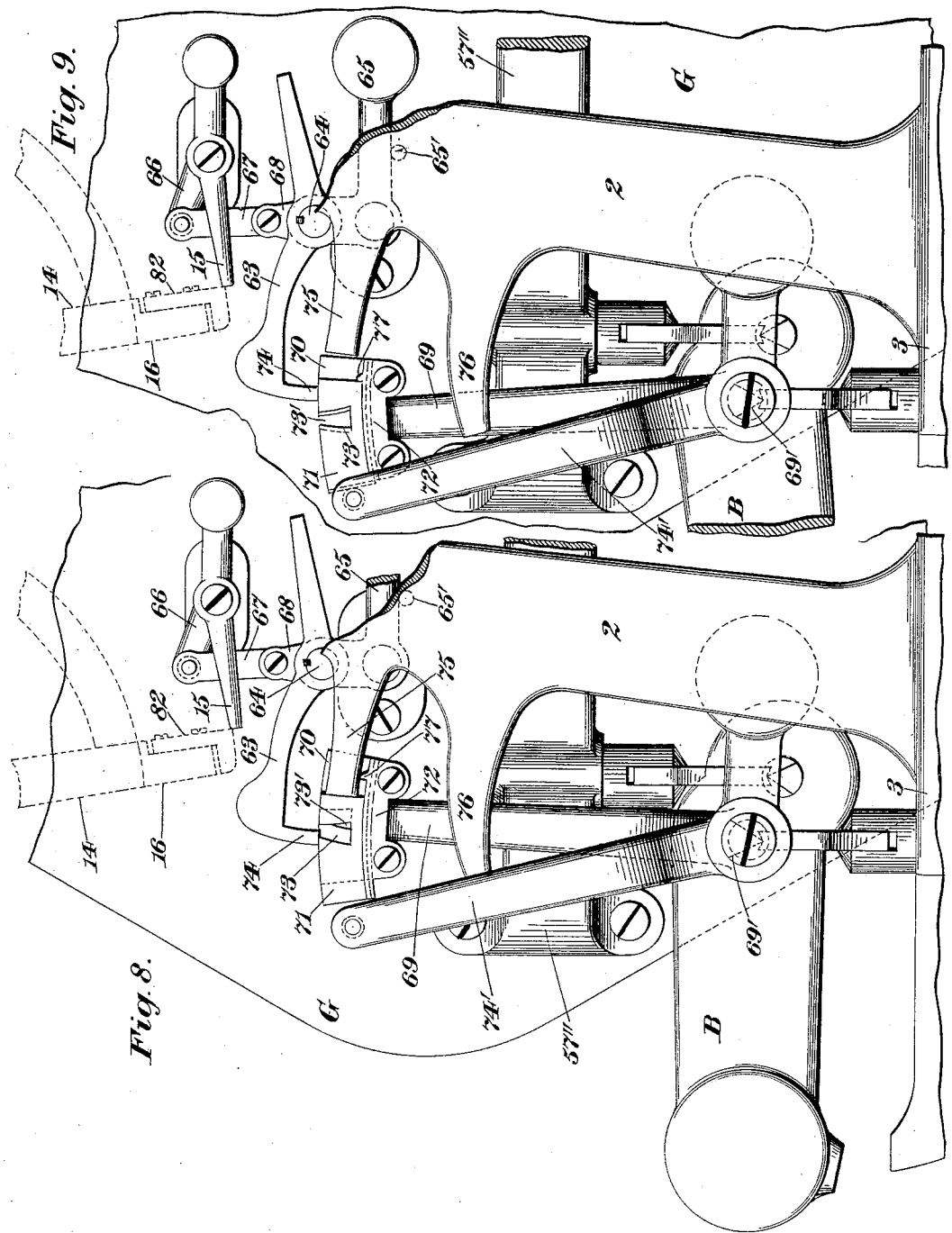

(No Model.) 8 Sheets—Sheet 7.

F. H. RICHARDS.
WEIGHING MACHINE.

No. 572,071. Patented Nov. 24, 1896.

Witnesses:
Chas. F. Schmelz
J. L. Edwards Jr.

Inventor:
F. H. Richards

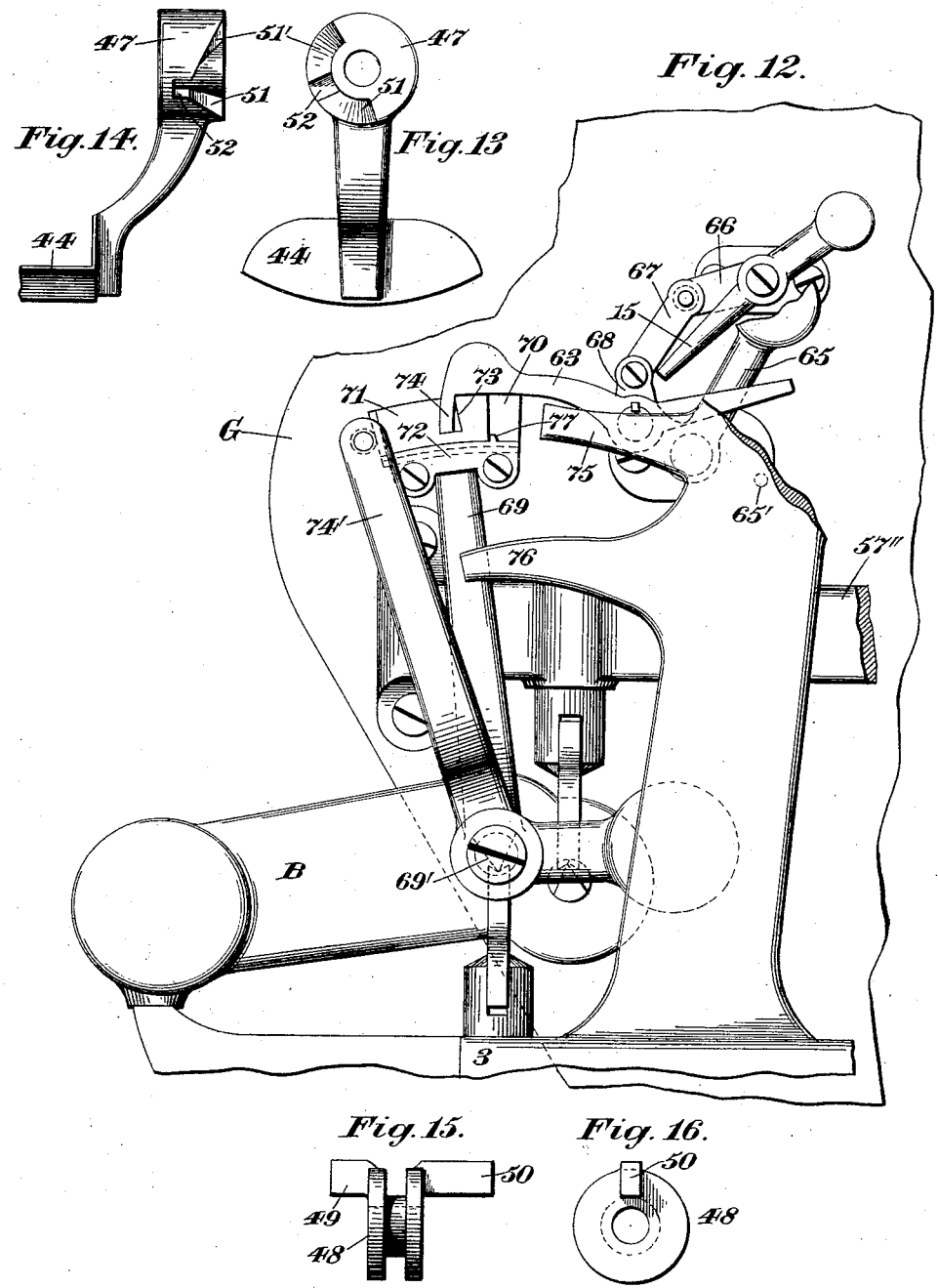

UNITED STATES PATENT OFFICE.

FRANCIS H. RICHARDS, OF HARTFORD, CONNECTICUT.

WEIGHING-MACHINE.

SPECIFICATION forming part of Letters Patent No. 572,071, dated November 24, 1896.

Application filed August 14, 1896. Serial No. 602,729. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, an object of the invention being to provide an improved machine of this character more especially intended for automatically weighing granular and pulverulent substances and fluids in very large quantities or lots—such as in the transference of grain, coal, or analogous materials from car to car—in a single operation of the machine.

With respect to one of its features the invention includes the employment, in connection with suitable weighing mechanism, of overloading, load-reducing, and auxiliary load-supply mechanisms, preferably operative in the order named and during the weighing of a load, whereby the material may be measured with facility and rapidity and with an accuracy equal to hand-weighing.

Another object of the invention is to furnish instrumentalities or safety devices of a suitable nature for precluding the premature movement or release of the load-discharging member of the weighing mechanism until a predetermined charge is made up, at which point said load-discharge member is instantly and automatically released.

In weighing-machines as heretofore constructed it has been the practice to make the load in a suitable receiver by continuous or successive additions of material, the custom being to supply the major part of the load to the receiver in a relatively short space of time and then to deliver the remainder of the load in the form of a slowly-running drip-stream of small volume, which will carry the bucket to and below the poising-line without affecting the accuracy of the load by the impact and the momentum of the mass, as would be the case if the whole load were supplied by a stream of large volume flowing at a relatively rapid rate of speed.

In a machine of very large capacity it has been found inexpedient to employ automatic weighing mechanism in which the exact load is made up by the delivery of single or successive supplies of material to the load-receiver or bucket, as the momentum and impact of the material against the mass already in the load-receiver, near the close of the weighing operation, is of such force as to impart an accelerated downward movement to the nearly-loaded bucket, thereby causing its premature descent below the poising-line, and, necessarily, the discharge of an underload, which, it is obvious, in a large-sized machine, results in a considerable error in weighing. By my present invention, however, large loads of true weight may be made up in an automatic weighing-machine by first delivering to the load-receiver an overload somewhat in excess of the proper amount to be weighed, then reducing or underloading, and subsequently restoring a quantity of the removed mass, these operations succeeding each other during the weighing of a load and until the load-receiver assumes a stationary position on the poising-line. I therefore consider within the scope of my invention any weighing machine or device of whatsoever kind including overloading, load-reducing, and auxiliary load-supply mechanisms of whatever character operative during the weighing of a load.

Figure 11:
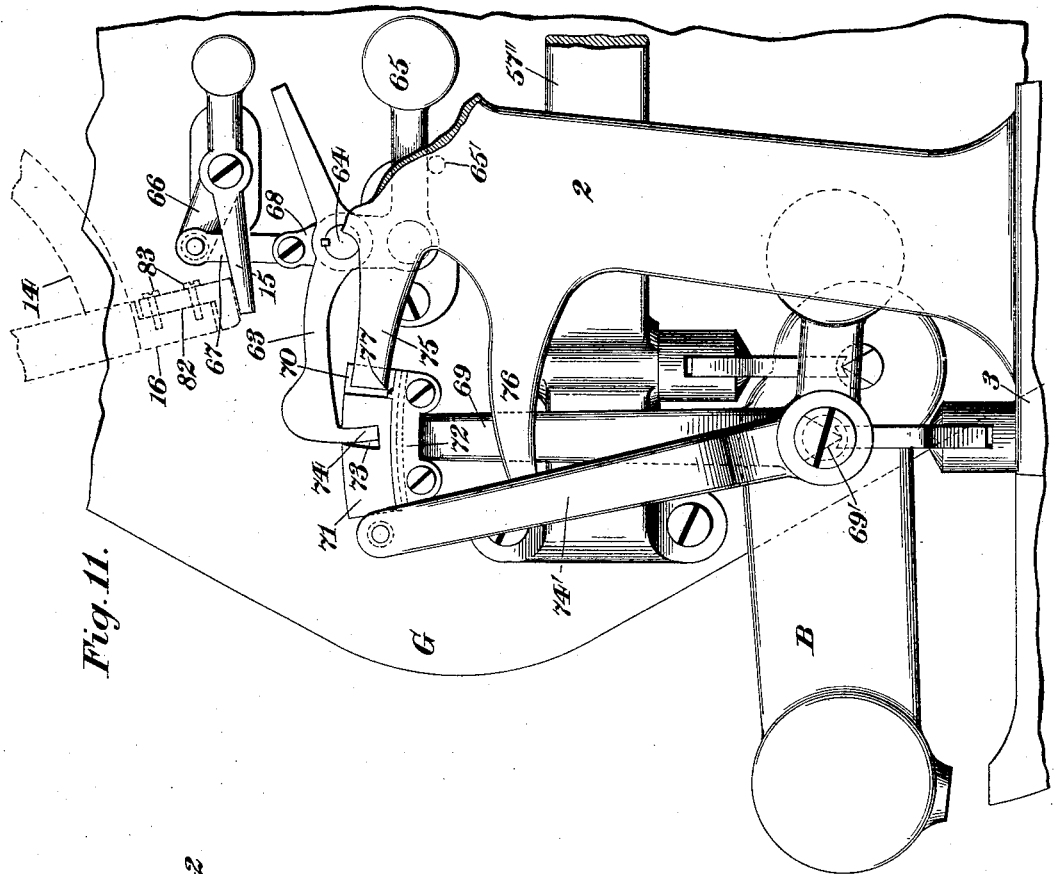
Figure 10:
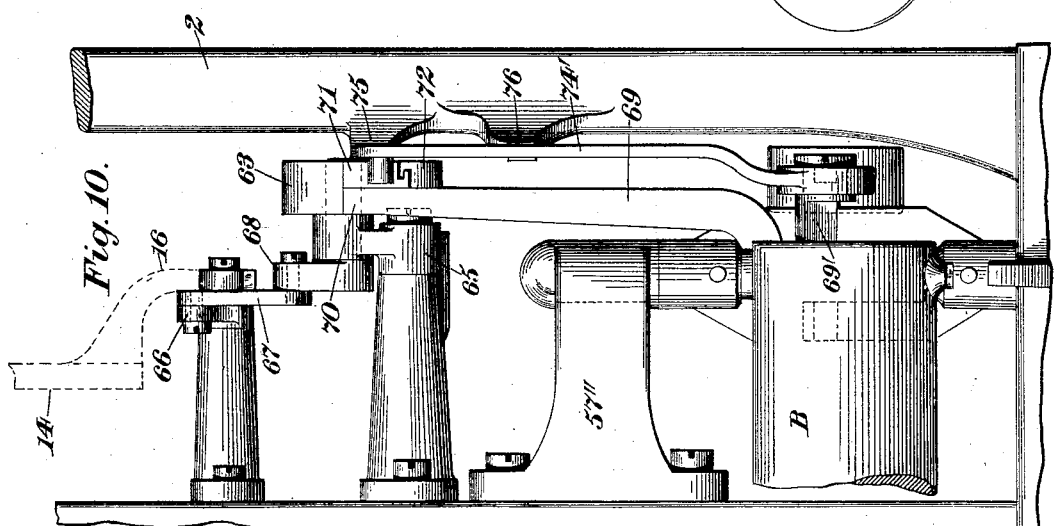

In the drawings accompanying and forming part of this specification, Figure 1 is a front elevation of a weighing-machine comprehending my present improvements in one of the embodiments thereof, the valve being open to permit an overloading of the load-receiver. Fig. 2 is an end elevation of the machine as seen from the left in Fig. 1, showing the load-receiver having descended below the poising-line with an overload. Fig. 3 is a view similar to Fig. 2, showing the bucket having ascended from its last position to a point above the poising-line to permit the introduction therein of a mass of material from an auxiliary load-supply device. Fig. 4 is a view similar to Figs. 2 and 3, showing the load-receiver discharging its contents. Figs. 5, 6, and 7 are detail views, on an enlarged scale, of the load-supply mechanism, the parts being in positions corresponding, respectively, with Figs. 2, 3, and 4. Figs. 8 and 9 are detail views, on an enlarged scale, of the load-discharge-controlling means in two successive positions. Fig. 10 is an elevation as seen from the left in Fig. 8. Figs. 11 and 12 are views similar to Figs. 8 and 9 and illustrate the positions of the load-discharge-controlling mechanism on the discharge of a load and the ascent of the empty load-receiver. Figs. 13, 14, 15, and 16 are detail views hereinafter more particularly described.

Similar characters designate like parts in all the figures of the drawings.

My present invention is in the nature of a modification of that set forth in my concurrently-pending application, Serial No. 598,555, filed July 9, 1896.

For demonstrating the nature and purposes of my present invention it is shown embodied in a weighing-machine or mechanism of the kind disclosed by Letters Patent No. 548,840, granted to me October 29, 1895, to which reference may be had.

The framework for supporting the operative parts of the machine may be of any suitable construction, and it is herein shown consisting of the end frames or columns 2 and 4, mounted upon the chambered supporting-base 3, into which the charges of material from the load-receiver are intermittingly discharged, and surmounted by the top plate 5, which is connected by suitable fastening means to the two end frames 2 and 4.

A supply chute or hopper is shown at H and will be hereinafter more particularly described, said chute or hopper being conveniently formed integral with the top plate 5.

The automatic weighing mechanism comprises a suitable load-receiver, in which the loads or charges of material are made up, and that shown herein consists of a bucket G of the well-known "single-chamber" class.

For sustaining the bucket I have illustrated herein beam mechanism of the duplicate type, consisting of the counterweighted scale-beams B and B', fulcrumed on the base 3, as is usual, and provided with the well-known knife-edges on the poising sides thereof for supporting the bucket.

For controlling the discharge-outlet of the bucket a shiftable load-discharge member in the nature of a gang-closer is shown at L, such member consisting of a series of overlapping oscillatory plates 6, which are of compound curvature in cross-section, which, when shut, constitute, practically, a composite structure. These plates are rigidly mounted on the transverse shafts 7, which latter are suitably journaled in bearings on the end walls of the bucket, with the exception of the last one of the series, the shaft of which works in a longitudinal sleeve 8 on the front wall of the bucket. The respective closer-plates are so organized that they have a preponderance of weight at one side of the axes of movement thereof, (herein illustrated as the "left,") so that when freed of restraint at the proper point in the operation of the machine the mass of material contained within the bucket will force said plates open, as indicated in Fig. 4, to thereby permit the discharge of the bucket-load. The shaft of the first one of the series of closer-plates 6 has rigidly connected thereto the angle-lever 9, the remaining shafts being furnished with the rock-arms 10, said rock-arms and one arm of the angle-lever being united by the bar 12, whereby a movement in unison of the respective closer-plates is insured as they open or shut.

A relatively long rod is shown at 13 pivoted at its lower end to one arm of the angle-lever 9 and at its upper end to the rocker 14, the latter in turn being supported by the bucket G for oscillatory movement, and constituting in one of its functions a stop for maintaining the overload-controlling valve against opening movement while the bucket is discharging its load.

It will be apparent that by the employment of the closer mechanism herein illustrated the amount of power necessary to hold the closer-plates against discharge movement is materially reduced.

A closer-latch is shown at 15 mounted for swinging movement on the bucket G and in position for engaging the rocker-arm 16 when the closer-plates 6 are shut. It will be evident that on the movement of the latch 15 below the arc of oscillation of the rocker-arm 16 the rocker 14, and hence the connected closer-plates, are free to open, to thereby empty the bucket.

For returning the respective closer-plates to their normal positions the outermost shaft 7 of the series is furnished with the counterweighted segmental blade 17 of suitable closer-shutting efficiency.

My present invention contemplates the provision of weighing mechanism and automatically-operating overloading, load-reducing, and auxiliary load-supplying means operative during the weighing of a load.

The hopper or chute H constitutes a suitable means for overloading or overpoising the load-receiver or bucket and will be constantly supplied with a mass of material, said hopper being of sufficient capacity to deliver a stream of relatively large volume to the bucket.

A supply-conduit is shown at 18, the mouth of which registers with the inlet-opening of the chute H, and is furnished with the horizontally-disposed check-valve 19 of the usual construction.

A pair of yieldingly-mounted and oppositely-inclined stream-brakes are shown located within the chute H, and consist of the approximately flat baffle-plates 20 and 21, having bearing lugs or ears at the outer ends thereof for the reception of pivot-screws passing through the walls of the hopper. Said plates, being disposed in the path of flow of the supply-stream to the bucket, will materially break the force of impact of the down-flowing mass, so that such force is not directly exerted against the valve, and liability to derangement of the latter is wholly removed.

By reason also of the mounting of the two plates 20 and 21 to yield they thereby conform to any inequalities in the supply-stream, which is an important factor, as when the machine is weighing certain kinds of free-flowing substances which contain occasional lumps said lumps, as they come in contact with the two plates, will cause them to "give," consequently preventing the chute H from choking up with an accumulation of material.

For returning the two plates to their normal positions, when such a contingency as that just pointed out arises, they will be preferably counterweighted, the counterweighted arms 22 and 23 attached thereto being shown for the purpose.

The front and rear walls of the chute or hopper will be also inclined to further check the momentum of the downflowing stream, which is of considerable volume, said front wall having a stream-directing lip 24, (see Fig. 2,) deflected above the normal plane of inclination thereof, for a purpose that will hereinafter appear.

For controlling the stream from the hopper H a valve 25 is illustrated, it being of the type disclosed in Letters Patent No. 535,727, granted to me March 12, 1895, and having a swinging movement under the supply-opening of said chute or hopper, said valve being pivotally supported between the laterally-extending arms 5' on the top plate 5. The stream-directing edge 24 of the front wall of the chute or hopper H tends to deliver the downflowing stream of material away from the discharge edge of the valve and into the concavity of said valve, whereby the power necessary to effect the closure thereof is materially reduced.

For closing the valve I have illustrated mechanism substantially similar in construction and mode of operation to that disclosed in Letters Patent No. 548,843, granted to me October 29, 1895, to which reference may be had, and it consists of a counterweighted lever 26, pivotally supported by the framing of the machine and having an antifriction-roll 27, adapted to bear against the depending cam 28, which is oscillatory with the valve 25.

In order to prevent the discharge of the load from the bucket while the valve is open and also to maintain said valve shut while the closer is open, I have illustrated reciprocally-effective interlocking mechanism. The overload-controlling valve 25 has secured thereto for movement in unison therewith the stop 29, the rocker 14, to which allusion has hereinbefore been made, constituting a coacting stop. Should the latch 15 be maliciously tripped, the point 14' of the rocker 14 will impinge against the curved face of the stop 29 and the oscillation of said rocker, and hence the opening of the closer, will be blocked. When the valve is closed, the rocker 14 on the tripping of the latch will be oscillated as the closer opens, and its curved face will bear against the point 29' of the valve-operative stop, thereby holding the valve closed, and this relation will continue until the closer-plates 6 have resumed their shut positions.

For opening the valve 25 the shiftable counterweighted lever 30 may be employed, it being pivoted adjacent to the poising side of the beam B and adapted on one of its strokes to impart an upward thrust to the connecting-rod 31, which is jointed to the lateral extension 32 of the valve, thereby forcing said valve open to permit an overloading of the bucket G by a supply of material from the chute or hopper H. The counterweight of the lever 30 is furnished with a suitable recess 33, which takes over a pin or stud 33', projecting from the weight of the adjacent beam B', so that as the beam mechanism descends with the overloaded bucket said lever will constitute, practically, a fixed extension of said beam B', and the rod 31 bearing against the inner end of said lever the closure of the valve 25 by the lever 26 will be limited in correspondence with the movement of the beam mechanism, it being apparent that the valve-opening lever 30 exerts a force in excess of the valve-closing lever 26.

The stop 14, it will be remembered, is operative for maintaining the valve 25 closed by engaging the valve-operative stop 29, this action continuing until the respective closer-plates are latched in the shut positions. When a certain portion of the load is discharged from the bucket G, the weights of the two beams B and B' will overbalance the lightened bucket and thereby cause its ascent, the valve 25 of course being locked closed while the load is discharging, and on the continuation of the beam movement the connecting-rod 31 will be engaged by the lever 30 on the beam B', said lever being thereby held against return movement with said beam B', so that the latter will fall away from said lever and resume its normal position. When the closer or closer-plates 6 are shut, the valve 25 of course will be released, as also the lever 30, and as said lever drops to its normal position its stroke will be transferred to the valve 25 through the connecting-rod 31, against which it bears, for opening said valve, substantially in the manner disclosed in the Letters Patent first hereinbefore referred to.

For reducing the overload supply to the bucket a load-reducing opening or outlet will be preferably formed in a wall of the bucket and at a suitable point between the receiving and delivering ends thereof, such opening in the present instance being at the end of the spout 34, which communicates with the interior of the bucket.

The stream-directing wall of the load-reducing spout 34 will be preferably inclined downwardly for a purpose that will hereinafter appear.

I have herein illustrated a valve for controlling or regulating the reduction of the overload, said valve being reciprocatory across the opening of the load-reducing spout 34, and being also a two-way valve, the valve being designated by 35. Said valve 35 is rigidly connected to the supporting rock-shaft 36, said shaft being journaled by the arms of the bifurcated bracket 37, attached to the end wall of the bucket.

For actuating the valve 35 to cut off the stream from the spout 34 the shaft 36 is provided with a counterweighted arm 38, which normally tends to shut said valve.

For opening the valve 35 to permit the flow from the spout 34 of the overload from the bucket to reduce said load connections with the beam mechanism will be preferably employed.

A substantially vertically-disposed rod is shown at 39 pivoted to the counterweighted lever 30 and the guide-link 40, which is attached to the framing of the machine, said rod having the valve-actuator 41 thereon. The valve-supporting rock-shaft 36 has the rigid projection 42 thereon, which is located in the path of movement of the actuator 41, and the operation of these connected parts is as follows: The bucket G will be overloaded by a stream of material which gravitates from the chute H, such stream being delivered into the empty bucket by the valve 25, and on the receipt of an overload the beam mechanism will be overpoised, and the bucket G with its contents thereby caused to descend to a point below the poising-line, as shown in Fig. 2. As the bucket and beam mechanism pass below the poising-line, the valve-actuating bar descending in unison therewith, the valve-actuator 41 will be carried into engagement with the projection 42 on the valve-supporting shaft 36, thereby forcing the valve open or swinging it to the right, and the surplus or overload within the bucket will flow or pour from the spout 34 until the mass within the bucket is reduced to an underload, or diminished beyond that determined upon for a true charge. As the bucket is lightened it will immediately rise—due to the action of the beam mechanism—and to a point above the poising-line, the result being a closure of the valve 35 by the counterweighted arm 38, and consequently the cut off of the stream from the spout 34.

It will be evident that as the beam mechanism rises during the weighing of a load the lever 30 will move therewith, but not sufficiently far to cause the opening of the overload-controlling valve 25.

The mass of material which constitutes the overload will be preferably directed into a surplus-receiver or auxiliary load-supply device, which in the present instance is supported independently of the weighing mechanism, being shown herein as a storage hopper or box 43, firmly attached to the bracket or arm 43', which projects inward from the end frame 2, and is in approximate vertical alinement with the spout 34, it being situated intermediate the load-reducing and auxiliary load-receiving openings.

As the bucket passes below the poising-line the surplus or overload will be removed therefrom; in other words, the contents will be diminished or reduced to an underload, such surplus being delivered to the auxiliary supply-hopper 43. On the underloading of the bucket it will be lightened, of course, and will slowly rise to a point slightly above the poising-line, at which time a part of the material from the auxiliary supply device will be redelivered to the bucket, again causing its descent below the poising-line, the bucket slowly oscillating above and below the poising-line for a limited distance until the true load or charge is made up or weighed, at which time said bucket will assume, with the beam mechanism, a stationary or true poised position on the poising-line, simultaneously with which the load will be discharged.

It will be apparent, of course, that the amounts of material removed from and restored to the bucket will be proportional to the movements of the bucket—that is to say, the farther above or below the poising-line the bucket may be the greater or less will be the amounts taken from or delivered to the bucket, such amounts gradually diminishing in each case until the true charge is made up.

I have also illustrated a valve for controlling or regulating the efflux or outflow of material from the auxiliary supply-hopper 43, such valve being designated by 44 and being also reciprocatory across the mouth or opening of said hopper to either cover or uncover said opening for permitting the flow of the stream from said hopper or for cutting it off. It is apparent, though, that some other medium than a valve of the kind shown might be utilized for this purpose.

An auxiliary or supplemental load-receiver is shown at 45, it being in the nature of a conduit or spout communicating with the interior of the bucket (see Fig. 1) and preferably having its outer wall inclined toward the discharge-outlet of the bucket, so that on the opening of the closer L the mass of material which is in said auxiliary load-receiver or spout may readily gravitate therefrom, as it forms a complemental part of the true load, into the bucket, from whence it passes through the discharge-outlet thereof, the load-receiving opening of said spout being controlled by the auxiliary load-supply valve.

The valve 44 is shown sleeved to the support or pivot 46, which is carried by the framing of the machine, the hub 47 of said valve being loose on or movable about said pivot and constituting one member of a clutch, the coöperating or sliding member of said clutch being designated by 48. The slide member of said clutch consists of a circumferentially-grooved sleeve having the lugs 49 and 50 oppositely projecting from the body portion thereof. The inner face of the hub 47 has formed thereon oppositely-inclined guidefaces 51 and 51', which merge in or lead to the recess 52, into which latter the lug or key 49 is thrust, whereby the two clutch members may be coupled.

It will be apparent that when the two parts 47 and 48 are coupled a force applied to the lug 50 will actuate the valve 44, said lug also being coupled to and practically forming a part of said valve.

The reciprocating bar 39, to which I have hereinbefore referred, is shown furnished with a by-pass actuator consisting of a spring-pressed dog 53, which, when the two clutch members are coupled, as just described, by engaging under the projection or lug 50, as the underloaded bucket rises, will thereby swing the valve 44 open to deliver a portion of the material from the auxiliary load-supply hopper 43 to the auxiliary load-receiver 45, from whence it passes into the bucket. As the actuator or dog 53 falls away from the lug 50 the valve 44 will shut by its own weight, it being in the nature of a self-closing valve.

When the bucket G assumes a stationary position on the poising-line, the material within the spout 34, it will be understood, constitutes a part of the true load, and it is important that it should be discharged from said spout on the emptying of the bucket. The surplus within the auxiliary load-supply device 43 does not, however, form a part of the true bucket-load, as from the mass temporarily stored within said device portions are gradually removed and restored during the weighing of a load, and it is essential that the material within said device should be prevented from escaping on the discharge of the true bucket-load. For this purpose the clutch consisting of the two members 47 and 48 will be preferably utilized, the movable member 48 being slid away from its mate or the valve-hub 47, the lug 49 of course being withdrawn from the recess 52, so that when the lever 30, as the bucket discharges its load—the bucket and beam B' of course ascending together—moves from the position illustrated in Fig. 4 to and against the rod 31 the actuator or dog 53, when it impinges against the projection 50, will simply rock the clutch member or sleeve 48 idly or ineffectively about its support without opening the valve, which for the time being is thrown out of action.

As a convenient means for actuating the two-way valve 35 to open the same or to swing it to the left to cause the material to flow from the load-reducing spout 34 on the completion of the true load I have herein illustrated operative connections with the closer L. A compound lever is shown at 54 pivotally supported on the bucket G and consisting of three arms operatively connected, respectively, with the closer, with the load-reducing regulating-valve, and with a regulator for the clutch. The rock-shaft 36 is provided with a crank-arm 55, to the outer end of which is pivoted the link 56, the opposite end of said link being likewise joined to the arm 54' of the compound lever 54.

A clutch-regulator is shown at 57, consisting of an angle-lever pivoted at its angle to the bucket-hanger 57'', one of its arms being furnished with a projecting pin or stud 58, which enters the groove or channel of the sliding clutch member 48, its other arm being connected with the arm 54'' of the compound lever by the interposed link 59. The third arm 54''' of the compound lever is connected by the link 60 to the angle-lever 9 of the closer L or to the first one of the series of closer-plates 6.

The operation of the parts just described will be clear on reference to the drawings.

Let it be assumed that a true load has been made up in the bucket and that the latch 15 has been tripped. On the tripping of the latch the closer-plates of course will be released and will be forced open by the weight of the discharging mass of material from the bucket, and as said plates open the angle-lever 9 will be oscillated to the left, this action being communicated to the connected valve 35 and moving it to the left, whereby the material within the spout 34 may escape, and simultaneously the arm 57' of the angle-lever 57 is moved to the right, Fig. 1, thereby sliding the clutch member 48 along its support and withdrawing the lug or key 49 from the recess 52, and consequently throwing the auxiliary load-supply valve 44 out of action. On the shutting of the closer the operation just described will be reversed, so that the respective parts may be returned to the normal positions thereof.

The bucket has an opening, which is shown herein formed at the outer end of the spout 61, the inlet-opening of said spout being adjacent to the load-reducing spout 34 and being also controlled by the load-reducing valve 35.

The spout 61 will preferably be inclined toward the discharge-outlet of the bucket, it being understood, of course, that it communicates with the interior of said bucket, so that when on the completion of the bucket-load the two-way valve 35 is swung to the left in the manner previously described the material within the load-reducing spout may gravitate therefrom and be delivered by the valve 35 into the spout 61, from whence it gravitates through the bucket and is discharged with the load therein.

On the discharge of the true bucket-load and the shutting and latching, respectively, of the closer-plates, the bucket at this time being empty, it is essential that the material within the auxiliary load-supply box 43 should be removed therefrom and be delivered into the empty bucket, so that the accumulation of material in said auxiliary load-supply box and subsequent overflow thereof will be prevented.

It will be understood that when the closer-plates 6 are shut the two clutch members 47 and 48, the former of course being the hub of the valve 44, will be coupled.

A rigid projection is shown at 62, such projection being in the nature of an actuator or opener for the valve 44 and being disposed below the lug 50 when the bucket is overpoised. As the shiftable member 30 returns to its normal position an upward thrust will be imparted to the connecting-rod 31 for the purpose of opening the valve 25, the projection 62 of said connecting-rod being thereby carried against the lug 50, and on the continuation of the upward movement of the rod 31 the valve 44 will be opened to permit the escape of the body of material in the auxiliary load-supply device, from whence it gravitates into the auxiliary load-receiver 45 and then into the empty bucket G, forming the nucleus of the succeeding load.

My present invention involves the provision, in connection with a load-receiver, of a load-discharge controller, means for causing the descent of said load-receiver below the poising-line, and instrumentalities for blocking the action of said load-discharge controller as the load-receiver passes below the poising-line.

In the embodiment of the invention herein illustrated the latch or detent 15, to which reference has been hereinbefore made, constitutes such a load-discharge controller, and its closer-releasing movement will be positively blocked or checked as the bucket passes below and above the poising-line during the making up of a load.

A latch-tripper is shown at 63, it being in the nature of a self-operating member and consisting of a counterweighted lever yieldingly supported for lateral movement. The latch-tripper 63 is fixed to a stud 64, projecting outward from the arm of the counterweighted angle-lever 65, which is mounted on the bucket G. The latch 15 is furnished with an integral extension or arm 66, operatively connected to the short arm of the angle-lever 65 by the interposed links 67 and 68.

The tendency of the latch-tripper 63, by virtue of its counterweight, is to drop or gravitate, but this action will be checked during the making up of a bucket-load by a suitable abutment against which the latch-tripper impinges or bears until the true load is made up, when it is instantly released and, drawing down the latch 15, disengages said latch from the detent or rocker-arm 16, whereby the rocker 14 is released, and hence the closer L is freed of all restraint.

A vertical standard or post is shown at 69 rigid with the extended pivot or knife-edge 69' of the beam B, it being evident that said post is reciprocatory with said beam as the latter oscillates above and below the poising-line during the making of a load. The post 69 is provided at its upper end with the transverse plate or head 70, conveniently formed integral therewith, which constitutes a part of the abutment for arresting the movement of the latch-tripper 63, the complemental member being the plate or block 71, which is connected to the first-mentioned part for sliding movement relatively thereto, it being held against displacement by suitable fastening means passing through the removable face-plate 72 and entering the plate 71. The upper faces of the two plates 70 and 71 are flush, being formed on concentric arcs, and are also intersected by notches or slots 73 and 73', which register or come into alinement when the bucket and beam mechanism assume an equipoised position on the poise-line and opposite the tooth 74 of the latch-tripper 63, so that such tooth may drop into the registered notches, thereby pulling down the latch 15 for effecting the release of the closer L. During the making up of the load the two plates will reciprocate back and forth, and, the tooth of the latch-tripper bearing against the upper curved faces thereof, it will be seen that said latch-tripper will be held in its ineffective position and the latch will not be tripped.

A counterweighted angle-lever is illustrated at 74', it being in the nature of a stroke-transmitter for the sliding block 71, the projection 75 on the end frame 2, as said sliding plate abuts against the same, checking its further action, though its mate continues its movement, so that the two recesses will be held out of alinement. The counterweighted lever 74', to which allusion has just been made, is supported for oscillation by the extended pivot or knife-edge 69' of the beam B, the upright arm of said angle-lever normally bearing against the sliding plate 71, the inward movement of said arm being limited by the projection 76 on the end frame 2.

The operation of the mechanism for controlling the discharge of the bucket-load will be obvious from an inspection of Figs. 8, 9, 11, and 12.

At the commencement of operation the sliding plate 71 will bear against the boss 77 on the removable face-plate 72, the tooth 74 of the latch-tripper 63 having been withdrawn from the registered recesses 73 and 73'.

The beam B, resting on the base 3, and the overload-controlling valve 25 being wide open, a stream of relatively large volume will flow from the chute H, gravitating into the empty bucket G, rapidly filling and overloading said bucket, and thereby causing its descent to a point below the poising-line, the beam mechanism of course descending in unison with said bucket. As the scale-beam B descends the post 69 thereon will swing to the right through a relatively wide arc, the upright arm of the angle-lever 74' moving therewith until it meets the projection 76, which intercepts its further movement, and the relatively-fixed plate 70 will swing a farther distance to the right, its recess 73' being carried past the plane of the tooth 74. On such movement of the parts the sliding plate will be engaged by the projection 75, so that for the time being the two recesses are prevented from registering. As a portion of the material is withdrawn from the bucket it, with the beam mechanism, will ascend to a point above the poising-line, the post 69 moving to the left, and when the sliding plate 71 abuts against the upright arm of the angle-lever 74' said plate is moved to the right. This action then continues, the reciprocal motion of the parts becoming less and less as the load in the bucket approaches the predetermined quantity to be measured, at which time the two recesses 73 and 73' will register at a point opposite the tooth 74, so that through the force exerted by the weight of the latch-tripper 63 said tooth may be thrust into the registered recesses 73 and 73' and the latch 15, by reason of its connections with the latch-tripper, thereby pulled down, so that the closer L will be released and its respective plates 6 may be forced open by the weight of the bucket contents.

As the load is discharged from the bucket the weights of the two beams B and B' will overbalance the lightened bucket and will immediately drop to their normal positions, and in so doing the latch-tripper 63, by reason of its yielding mounting, will move to the left with the post 69, which action will also raise the counterweighted arm of the angle-lever 65 away from the stud 65' on the bucket.

For withdrawing the tooth of the latch-tripper from the registered recesses 73 and 73' on the discharge of the bucket-load I may employ a device operative with the closer-holding means, such a device being shown at 77' as an outward-curved arm extending from the connecting-rod 13 and which has a movement into engagement with the tailpiece or non-counterweighted arm of the latch-tripper 63. On the release of the closer L, as described, the connecting-rod 13 will move through an approximately vertical path until the rigid arm 77' thereon comes into contact with the tailpiece of the latch-tripper, so that on the continuation of such movement such tailpiece will be depressed, thereby withdrawing the tooth 74 from the registered recesses 73 and 73', at which time the counterweighted arm of the angle-lever 65, dropping to its normal position against the stud 65', will return the latch-tripper 63 to its normal position.

It is desirable at infrequent intervals to make tests to ascertain if the machine is working properly, and for this purpose the following described instrumentalities may be employed: A relatively short rock-shaft is illustrated at 78 mounted on the end frame and carrying at its outer end the actuating-handle 79, which is preferably clamped thereto, the inner end of said shaft being furnished with the crank or cam 78'. The thumb-piece of the handle 79 will have a spring or other pin 80, which may be seated in either one of two openings formed in the end frame.

The operation of the parts just described will be clearly apparent from an inspection of the drawings. On making a test the actuating-handle 79 will be grasped and the pin 80 withdrawn from the opening in the frame in which it may be seated, and said handle will be rocked to the left until said pin is opposite the opening 81, into which it may be thrust to thereby hold the parts against movement. As the shaft 78 is rocked the crank 78' moves into engagement with the non-counterweighted arm of the latch-tripper, thereby blocking or throwing the same into an ineffective position, so that when the two recesses 73 and 73' register in the manner previously described the tooth 74 of said latch-tripper cannot drop into said registered recesses.

It will be remembered that the closer-holding means embody two engaging detents, one of these being a rocker-arm 16, the other being the latch 15, and one of said detents will be provided with a by-pass, and preferably at the point where said parts engage, for a purpose that will now appear. It will be understood that as soon as the latch-tripper 63 is returned to its normal position the tooth 74 thereof will immediately bear or rest against the curved and flush faces of the two reciprocating plates 70 and 71, which constitute an abutment for arresting the movement of the latch. The rocker-arm 16 is furnished with a by-pass 82 in the nature of a sliding block, constituting the outer end of said arm, which is held against lateral movement thereon by screws 83, passing through longitudinal slots formed in the face of said by-pass and seated in the relatively fixed portion of the rocker-arm, whereby said by-pass may have free longitudinal movement. As the latch or detent 15 is tripped and passes below the rocker-arm or detent 16 the rocker 14 is free to oscillate, and the closer L consequently may open. On the return movement of the rocker the by-pass 82 will impinge against the latch 15, which is held against movement, and will yield sufficiently so that said rocker-arm may pass by the latch, and when this action occurs the by-pass 82 will be instantly engaged by the latch 15.

The operation of a weighing-machine comprehending the hereinbefore-described improvements is as follows: Fig. 1 represents the positions occupied by the various parts at the commencement of operation, the bucket and the beam mechanism being in the elevated or uppermost positions thereof, and the overload-controlling valve 25 being wide open a stream of relatively large volume may flow from the chute H into the empty bucket, rapidly filling and overloading said bucket and causing its descent to a point below the poising-line, during which bucket movement the valve 25 will be concurrently closed by the counterweighted lever 26. (See Fig. 2.) As the overloaded bucket goes below the poising-line a downward pull will be exerted on the bar or rod 39, thereby moving the actuator thereon into engagement with the projection 42 on the valve-supporting rock-shaft 36, so that the valve 35 will be caused to open and a body of material to flow from the bucket G, through the spout 34, and into the auxiliary load-supply device 43 until the mass within the bucket is reduced or diminished beyond that determined upon for a true load. As the bucket is lightened it will be caused to rise by the weights of the two beams B and B', the bar 39 being thrust upward, and the actuator 41 on said bar, moving away from the projection 42, will permit the closure of the valve 35 by the counterweighted arm 38. The second actuator 53 on the rod or bar 39 will then engage under the projecting lug 50, which is keyed to the valve 44 for the time being, (see Fig. 6,) and will open said valve, thereby permitting a part of the overload to pass into the bucket G to the auxiliary load-receiver 45, the operations of the two valves alternating until the true load is completed, at which time the bucket and beam mechanism assume an equipoised position.

As the bucket and the beam mechanism are oscillating the two plates 70 and 71 reciprocate back and forth until the true load is made up, at which time the two recesses 73 and 73' in said plates may register at a point opposite the tooth 74 of the latch-tripper 63, so that said latch-tripper may move downward and its tooth 74 may be thrust into the said registered notches and the latch 15 simultaneously tripped for releasing the closer L, whereby the respective plates 6 thereof may be forced open by the weight of the contents within the bucket.

On the opening of the closer-plates 6 the rod 56, by virtue of its connections with said plates, will be instantly drawn down, and being connected with arm 55 of the load-reducing valve 35 the latter will be swung open to the left concurrently with the opening of the closer-plates 6 to permit the contents of the spout 34, attached to the bucket G, to be delivered to the spout 61, which communicates with said bucket, such contents constituting a part of the weighed load.

It is to be distinctly understood that my invention is not limited to the devices shown and described, and that it includes within its field any and all devices of whatsoever kind which are coöperative with weighing mechanism in the manner set forth.

Having described my invention, I claim—

1. The combination with a load-receiver, of overloading, load-reducing, and auxiliary load-supply mechanisms operative during the weighing of a load.

2. The combination with weighing mechanism, of overloading, load-reducing, and auxiliary load-supplying means operative during the weighing of a load.

3. The combination with an automatic weighing mechanism, of overloading, load-reducing, and auxiliary load-supplying means alternately effective during the weighing of a load.

4. The combination with a load-receiver, of overloading means therefor; load-reducing means supported by said receiver; and auxiliary load-supplying means operative during the weighing of a load.

5. The combination with framework, of a load-receiver; overloading means for said load-receiver; load-reducing means; and auxiliary load-supply means supported by the framework and operative during the weighing of a load.

6. The combination with a bucket, of the following instrumentalities operative in the order named—viz., overloading means, load-reducing means, auxiliary load-supplying means, and load-discharging means.

7. The combination with a bucket having a load-reducing opening therein, of the following instrumentalities operative in the order named during the weighing of a load—viz., overloading means, means for uncovering the load-reducing opening, and auxiliary load-supplying means.

8. The combination with framework and with a bucket having a load-reducing opening therein, of the following instrumentalities operative in the order named during the weighing of a load—viz., overloading means, means for uncovering the load-reducing opening, and auxiliary load-supplying means supported by the framework.

9. The combination with a bucket having a load-reducing opening, of the following instrumentalities operative in the order named during the weighing of a load—viz., overloading means, a load-reducing valve carried by the bucket, and auxiliary load-supplying means.

10. The combination with a bucket and with overloading means therefor, of load-reducing means; and means effective for resupplying material to the bucket during the weighing of a load.

11. The combination with a bucket and with overloading means therefor, of an auxiliary load-supply device; load-reducing means operative for removing material from the bucket and for delivering it to the auxiliary load-supply device; and means for effecting the withdrawal of material from the auxiliary load-supply device and returning it to the bucket.

12. The combination with framework and with a bucket, of overloading means for said bucket; an auxiliary load-supply device supported by the framework; load-reducing means operative for removing material from the bucket and delivering it to said auxiliary load-supply device; and means for withdrawing the accumulated material from said auxiliary load-supply device and returning it to the bucket.

13. The combination with a load-receiver and with overloading means therefor, of a scale-beam; beam-operated load-reducing means; and auxiliary load-supplying means.

14. The combination with a load-receiver, of overloading means therefor; load-reducing mechanism; and auxiliary load - supplying mechanism comprehending a valve.

15. The combination with a load-receiver, of overloading means therefor; load-reducing mechanism and auxiliary load - supplying mechanism, each of said mechanisms comprehending a valve, said valves being successively effective; and valve-actuating means.

16. The combination with a load-receiver, of overloading mechanism; load - reducing mechanism and auxiliary load - supplying mechanism, each of said mechanisms comprehending a valve, said valves being successively effective; and valve-actuating mechanism.

17. The combination with a load-receiver, of overloading means therefor; load-reducing and auxiliary load-supplying mechanisms, each comprehending a valve, said valves being alternately effective; and valve-actuating means.

18. The combination with a bucket having stream outlet and inlet openings in a wall thereof, of successively-effective stream-controllers therefor; and actuating mechanism for said stream-controllers.

19. The combination with a bucket having stream outlet and inlet openings in a wall thereof, of successively-effective stream-controlling valves therefor; and valve-actuating mechanism.

20. The combination with a bucket having stream outlet and inlet openings in a wall thereof, of overloading means for said bucket; successively-effective valves controlling said openings; and valve-actuating mechanism.

21. The combination with a bucket having outlet and inlet openings in a wall thereof, of stream-controlling devices for said openings; and load-supplying means intermediate said openings.

22. The combination with a bucket having outlet and inlet openings in a wall thereof, of devices for controlling said openings; overloading means for the bucket; and an auxiliary load - supply device intermediate said openings.

23. The combination with a bucket having load-reducing and auxiliary load-receiving openings, of valves for controlling the passage of material from and to said openings, said bucket being also provided with an opening positioned to receive the stream of material from the load-reducing valve.

24. The combination with a bucket having load-reducing and auxiliary load-receiving openings, of valves for controlling the supply of material from and to said openings; and a spout positioned to receive a stream of material from the load-reducing valve.

25. The combination with a bucket having load-receiving, load-reducing, and auxiliary load-receiving openings; of valves for controlling the passage of the material to said load-receiving openings and from said load-reducing opening.

26. The combination with a weighing mechanism, of a load-receiver; a load-supply device; and automatically-operated means for removing material from the load-receiver and delivering it to the load-supply device and for also restoring a portion of such material to the load-receiver from the load-supply device during the weighing of a load.

27. The combination with weighing mechanism, of a load-receiver; overloading means therefor; an auxiliary load-supply device; and automatically-operated means for removing material from the load-receiver and delivering it to the auxiliary load-supply device and for also restoring a portion of such material to the load-receiver from the auxiliary load-supply device during the weighing of a load.

28. The combination with weighing mechanism, of a load-receiver; a load-supply device; automatically-operated means for removing material from the load-receiver and delivering it to the load-supply device and for also restoring a portion of such material to the load-receiver from the load-supply device during the weighing of a load; and instrumentalities for emptying said load-supply device at a point subsequent to the completion of the true load.

29. The combination with a bucket, of an auxiliary load-supply device; automatically-operative means for removing material from the bucket and delivering it to said supply device and for also restoring a portion of said material to the bucket from the load-supply device; and successively-operative means for effecting the discharge of the bucket and also that of the load-supply device.

30. The combination with a bucket having a load-reducing spout and a spout communicating with the bucket and receiving material from said load-reducing spout, of an auxiliary load-supply device; a valve operative for delivering a portion of the material from the bucket to said load-supply device during the weighing of a load and for also delivering the material within said load-reducing spout to the spout communicating with the bucket on the completion of the load; and valve-actuating means.

31. The combination with a bucket having a load-reducing spout and a spout communicating with the bucket and receiving material from said load-reducing spout, of an auxiliary load-receiver; a valve controlling said load-reducing spout; and valve-actuating mechanism.

32. The combination with a bucket having a load-reducing spout, an auxiliary load-receiving spout, and a spout communicating with the bucket and receiving material from said load-reducing spout; of an auxiliary load-supply device located between the load-reducing and load-receiving spouts; and means for delivering a portion of material from the bucket to the load-supply device and from the latter to the load-receiving spout during the weighing of a load and for also delivering the material within the load-reducing spout to the spout communicating with the bucket.

33. The combination with a bucket, of a chute having an overload-controlling valve; load-reducing means; auxiliary load-supply means comprehending a valve; and an actuator for said last-mentioned valve operative with the overload-controlling valve.

34. The combination with a bucket, of a chute having an overload-controlling valve; load-reducing means; an auxiliary load-supply device comprehending a valve; and a rod provided with an actuator for said last-mentioned valve and connected to said overload-controlling valve.

35. The combination with a bucket having a load-reducing opening controlled by a valve; an auxiliary load-supply device located to receive a portion of material from said valve and comprehending a valve; valve-actuating mechanism; and means for throwing the valve for the auxiliary supply device out of action.

36. The combination with a bucket, of a hopper provided with a valve for delivering material therefrom to said bucket; an actuator for said valve; a closer for the bucket; and means operative with said closer for throwing said valve out of action relatively to its actuator.

37. The combination with a bucket, of a hopper provided with a valve sleeved to a support; a projection disposed in the path of movement of an actuator for said valve and normally coupled thereto; and means for uncoupling said projection from the valve.

38. The combination with a bucket having a closer, of a hopper provided with a valve sleeved to a support; a projection disposed in the path of movement of an actuator for said valve and normally coupled thereto; and means operative with the closer for automatically uncoupling said projection from the valve.

39. The combination with a bucket having a load-reducing spout and a load-supply spout, of an auxiliary load-supply device intermediate said spouts; a pair of valves, one for the load-reducing spout and the other for the auxiliary load-supply device; and a bucket-supporting scale-beam having a rod connected thereto, said rod carrying a pair of actuators, one for each valve.

40. The combination with a bucket having a load-reducing spout and a load-supply spout, of an auxiliary load-supply device intermediate said spouts; a pair of valves, one for the load-reducing spout and the other for the auxiliary load-supply device; and a bucket-supporting scale-beam having a rod connected thereto, said rod carrying a pair of actuators, one for each valve, one of said actuators being a by-pass actuator.

41. The combination with a bucket, of a hopper having a valve sleeved to a support, the hub of said valve constituting one member of a clutch; a complemental clutch member on said support normally coupled to its mate and provided with a projection disposed in the path of movement of an actuator for the valve; and means for uncoupling said clutch members.

42. The combination with a bucket having a closer, of a hopper; a valve for said hopper, said valve being sleeved on a support and having its hub constituting one member of a clutch; a sliding clutch member on said support and normally coupled to its mate and having also a projection disposed in the path of movement of an actuator for said valve; and a lever for uncoupling said clutch members, said lever being operatively connected with the closer.

43. The combination with a bucket having a closer, of a hopper; a valve for said hopper, said valve being sleeved to a support and having its hub constituting one member of a clutch; a sliding clutch member on said support normally coupled to its mate and provided with a projection disposed in the path of movement of an actuator for said valve; and a lever for controlling said sliding clutch member, said lever being operatively connected with the closer.

44. The combination with a bucket having a closer, of a hopper; a valve for said hopper sleeved on a support and having its hub constituting one member of a clutch; a sliding clutch member normally coupled to its mate and provided with a projection disposed in the path of movement of an actuator for the valve; a lever for uncoupling said clutch; a compound lever; and operative connections between said levers and the bucket-closer.

45. The combination with a bucket having load-reducing and auxiliary load-supplying openings, each controlled by a valve; of a closer for the bucket; and means operative with the closer for simultaneously opening one of said valves and throwing the other out of action.

46. The combination with a load-receiver, of a load-discharge controller; means for causing the descent of said load-receiver to a point below the poising-line; and instrumentalities for blocking the action of said load-discharge controller as the bucket passes below the poising-line.

47. The combination with a load-receiver and with overloading means for causing the descent of the load-receiver to a point below the poising-line, of a load-discharge controller; and instrumentalities for blocking the action of said load-discharge controller as the bucket passes below the poising-line.

48. The combination with a load-receiver and with overloading and load-reducing means therefor for successively causing the descent and ascent of the load-receiver below and above the poising-line, of a load-discharge controller; and instrumentalities for blocking the action of said load-discharge controller as the bucket passes below and above the poising-line.

49. The combination with a load-receiver, of a load-discharge controller; means for causing the descent of said load-receiver to a point below the poising-line; instrumentalities for blocking the action of said load-discharge controller as the bucket passes below the poising-line; and automatically-operated means for releasing said load-discharge controller at a predetermined point.

50. The combination with a bucket embodying a shiftable load-discharge member normally held against movement by means comprehending a latch, of overloading means for the bucket, whereby it is caused to descend to a point below the poising-line; and instrumentalities for blocking the action of said latch as the bucket passes below the poising-line.

51. The combination with a bucket embodying a shiftable load-discharge member normally held against movement by means comprehending a latch, of a latch-tripper; overloading means for the bucket, whereby it is caused to descend to a point below the poising-line; and instrumentalities for blocking the action of said latch-tripper as the bucket passes below the poising-line.

52. The combination with a bucket embodying a shiftable load-discharge member normally held against movement by means comprehending a latch, of a self-active latch-tripper.

53. The combination with a bucket embodying a shiftable load-discharge member normally held against movement by means comprehending a latch, of a self-active latch-tripper; means for causing the descent of the bucket to a point below the poising-line; and instrumentalities for blocking the action of the latch-tripper on said bucket movement.

54. The combination with a bucket embodying a shiftable load-discharge member normally held against movement by means comprehending a latch, of a counterweighted latch-tripper; and means for holding said latch-tripper against movement during the weighing of a load.

55. The combination with a bucket embodying a shiftable load-discharge member normally held against movement by means comprehending a latch, of a yieldingly-mounted, self-active latch-tripper.

56. The combination with a bucket embodying a shiftable load-discharge member normally held against movement by means comprehending a latch, of a latch-tripper provided with a tooth; a pair of reciprocatory, recessed plates; and means for sliding one of said plates relatively to the other, whereby the recesses may be caused to register, and the tooth on said latch-tripper may be thrust into said registered recesses.

57. The combination with a bucket embodying a shiftable load-discharger normally held against movement by means comprehending a latch, and with a supporting scale-beam for said bucket; of a pair of recessed plates connected to and reciprocative by the beam; a toothed latch-tripper; and means for sliding one of said plates relatively to the other, whereby the two recesses will be caused to register, and the tooth of the latch-tripper will be thrust into said registered recesses.

58. The combination with framework having a projection, of a bucket embodying a shiftable load-discharge member normally held against movement by means comprehending a latch; a latch-tripper provided with a tooth; a scale-beam; a pair of plates connected to said scale-beam and each having a recess, one of said plates having a sliding movement relatively to the other; and a lever for sliding said plate, whereby the two recesses in said plates will be caused to register and into which registered recesses the tooth of the latch-tripper will be thrust.

59. The combination with a bucket embodying a shiftable load-discharge member normally held against movement by means comprehending a latch, of a bucket-supporting scale-beam provided with a post which carries two plates, one of which has a sliding movement relatively to the other, each of said plates having a recess which registers at a predetermined point in the operation of the machine; means for sliding one of said plates relatively to the other, to thereby cause the recesses to register; and a latch-tripper having a tooth adapted to be thrust into the registered recesses.

60. The combination with a bucket embodying a shiftable load-discharge member normally held against movement by means comprehending a latch, of a latch-tripper mounted on a pivotally-supported lever and operatively connected with the latch, said latch-tripper having a tooth; a pair of plates provided with recesses; and means for sliding one of said plates relatively to the other.

61. The combination with a bucket having a closer normally held against movement by means comprehending a latch, of a latch-tripper having a tooth; a pair of recessed plates; means for reciprocating said plates, whereby the recesses thereof may be caused to register, into which registered recesses the tooth of the latch-tripper may be thrust; and means for returning said latch to its normal position.

62. The combination with a bucket having a closer, of means comprehending a rod and a latch for holding said closer against opening movement, said rod being reciprocatory and provided with an arm; a latch-tripper provided with a tooth; a pair of recessed plates; and means for reciprocating said plates, whereby the recesses will be caused to register, into which registered recesses the tooth of the latch-tripper may be thrust, said latch-tripper being so situated as to be returned to its normal position by the arm on said rod on one of the strokes thereof.

63. The combination with a bucket having a closer, of means comprehending a latch for holding said closer against movement; a latch-tripper having a tooth and mounted on a lever operatively connected to the latch; and a pair of recessed, reciprocatory plates; and means for reciprocating said plates, whereby the recesses will be caused to register, into which registered recesses the tooth of the latch-tripper may be thrust.

64. The combination with a bucket having a closer, of closer-holding means comprehending two engaging detents, one of which is provided with a by-pass.

65. The combination with a bucket having a closer, of a rocker operatively connected thereto and having a rocker-arm provided with a by-pass; and a latch for engaging said rocker-arm.

66. The combination with a bucket having a closer, of a rocker connected to said closer and having an arm provided with a by-pass; a latch for engaging said rocker-arm; and means for normally blocking the action of said latch.

67. The combination with a bucket having a closer, of a rocker operatively connected thereto; a latch for engaging said rocker, said latch having an extension; a latch-tripper mounted on a counterweighted lever connected by links to the extension of the latch; and means for normally limiting the action of said latch-tripper.

68. The combination with a bucket having a closer, of means comprehending a latch for holding said closer against opening movement; a lever constituting a latch-tripper; and a rock-shaft having a crank adapted to bear against one of the arms of said lever; and means for operating and holding said shaft against movement.

69. The combination with a chute having an inclined wall, a portion of which is deflected above the normal plane of said wall, whereby such deflected portion is adapted to direct a stream of material away from the discharge edge of a valve for said chute; of a valve for said chute; and actuating mechanism for said valve.

70. The combination with a chute having therein a pair of oppositely-inclined, yieldingly-mounted baffle-plates; of a valve for said chute; and valve-actuating mechanism.

71. The combination with a chute having a pair of oppositely-inclined, counterweighted baffle-plates; of a valve for said chute; and valve-actuating mechanism.

72. The combination with a bucket, of a closer therefor consisting of a series of overlapping plates; means for operatively connecting and maintaining said plates in the shut positions thereof; closer-releasing mechanism; and a counterweight connected to one of said plates for shutting the series.

73. The combination with a bucket, of a closer therefor consisting of a series of operatively-connected, overlapping, curved plates mounted on shafts having rock-arms; a bar uniting the several rock-arms; a rocker mounted on the bucket and operatively connected to the closer; and a latch for engaging said rocker.

FRANCIS H. RICHARDS.

Witnesses:
 FRED. J. DOLE,
 GEO. A. HOFFMAN.